US011203113B1

(12) United States Patent
Sandin et al.

(10) Patent No.: US 11,203,113 B1
(45) Date of Patent: Dec. 21, 2021

(54) SEGMENTED BENDING SYSTEM FOR AN AMUSEMENT PARK ATTRACTION

(71) Applicant: Universal City Studios LLC, Universal City, CA (US)

(72) Inventors: Terry Orion Sandin, Los Angeles, CA (US); Jonathan Harris Sangel, Los Angeles, CA (US); Eli Joseph Romaire, Los Angeles, CA (US); Eric Schuh, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 17/186,486

(22) Filed: Feb. 26, 2021

(51) Int. Cl.
| *B25J 9/06* | (2006.01) |
| *A63G 31/00* | (2006.01) |
| *B25J 9/10* | (2006.01) |
| *B25J 17/00* | (2006.01) |
| *B25J 11/00* | (2006.01) |
| *B25J 18/06* | (2006.01) |

(52) U.S. Cl.
CPC ............. *B25J 9/06* (2013.01); *A63G 31/00* (2013.01); *B25J 9/109* (2013.01); *B25J 11/003* (2013.01); *B25J 17/00* (2013.01); *B25J 18/06* (2013.01)

(58) Field of Classification Search
CPC ..... B25J 9/06; B25J 9/109; B25J 18/06; B25J 11/003; A63G 31/00; A63G 31/02; A63G 31/06
See application file for complete search history.

(56) References Cited

U.S. PATENT DOCUMENTS

| 4,435,120 A * | 3/1984 | Ikeda ........................ B25J 9/06 414/4 |
| 4,724,716 A * | 2/1988 | Kawai ........................ B25J 9/06 74/490.05 |
| 5,456,568 A * | 10/1995 | Kirby ....................... B25J 18/06 414/722 |
| 6,619,146 B2 * | 9/2003 | Kerrebrock ............. F16H 21/46 446/376 |
| 7,047,835 B2 * | 5/2006 | Yamagishi ................. B25J 9/06 74/490.03 |
| 9,211,200 B2 * | 12/2015 | Moyer ..................... A61F 2/586 |
| 9,707,003 B2 * | 7/2017 | Hoell, Jr. ............... A61B 17/29 |
| 2013/0057004 A1 | 3/2013 | Murata et al. |

FOREIGN PATENT DOCUMENTS

KR          101490217 B1     2/2015

* cited by examiner

*Primary Examiner* — William Kelleher
*Assistant Examiner* — Gregory T Prather
(74) *Attorney, Agent, or Firm* — Fletcher Yoder, P.C.

(57) ABSTRACT

A segmented bending system includes multiple linkages coupled to one another in a stacked arrangement. The segmented bending system also includes multiple rotation assemblies coupled to one another to extend through the multiple linkages. The multiple rotation assemblies include multiple cam members, and each cam member of the multiple members extends into a respective opening formed in a corresponding linkage of the multiple linkages. At least one cam member of the multiple cam members is offset from at least one other cam member of the multiple cam members in a circumferential direction about a center axis of the multiple rotation assemblies.

20 Claims, 6 Drawing Sheets

SEGMENTED BENDING SYSTEM FOR AN AMUSEMENT PARK ATTRACTION

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include various attractions that provide enjoyment to guests. For example, the amusement park may include a ride attraction in which a ride vehicle carries one or more guests along a path that passes one or more animated figures (e.g., a figure with one or more actuators that can be controlled to move figure components). Animated figures may include robotic assemblies that can be themed to look like living creatures (e.g., an assembly of one or more actuators that are themed to look like a dragon). The amusement park may additionally or alternatively include other types of attractions, such as a haunted house attraction in which one or more guests walk along a path that passes one or more animated figures (e.g., themed robotic figures) or a character attraction in which one or more guests interact with one or more animated character heads (e.g., worn by a human performer). Indeed, the amusement park may include any of a variety of different types of attractions with different types of entertainment elements, and at least some of the entertainment elements (e.g., animated figures, animated character heads, mechanical structures) may have components that move to provide a visual effect.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a segmented bending system includes multiple linkages coupled to one another in a stacked arrangement. The segmented bending system also includes multiple rotation assemblies coupled to one another to extend through the multiple linkages. The multiple rotation assemblies include multiple cam members, and each cam member of the multiple cam members extends into a respective opening formed in a corresponding linkage of the multiple linkages. At least one cam member of the multiple cam members is offset from at least one other cam member of the multiple cam members in a circumferential direction about a center axis of the multiple rotation assemblies.

In one embodiment, a segmented bending system includes a first segment having a first linkage and a first rotation assembly. The segmented bending system also includes a second segment having a second linkage coupled to the first linkage and a second rotation assembly coupled to the first rotation assembly. The first rotation assembly includes a first cam member that is configured to engage a first opening in the first linkage to drive the first linkage to bend in a first direction in response to rotation of the first rotation assembly in a circumferential direction about an axis of the segmented bending system, and the second rotation assembly includes a second cam member that is configured to engage a second opening in the second linkage to drive the second linkage to bend in a second direction in response to rotation of the first rotation assembly in the circumferential direction.

In one embodiment, a segmented bending system includes a first linkage and a first rotation assembly, wherein the first rotation assembly includes a first ball joint, a first cup that supports the first ball joint, and a first cam member that extends from the first cup and into a first opening formed in a first bar of the first linkage. The segmented bending system also includes a second linkage and a second rotation assembly, wherein the second rotation assembly includes a second ball joint, a second cup that supports the second ball joint, and a second cam member that extends from the second cup and into a second opening formed in a second bar of the second linkage, and the second opening is offset from the first opening relative to a circumferential direction. The segmented bending system further incudes a drive system configured to drive rotation of the first rotation assembly in the circumferential direction to cause the first linkage and the first rotation assembly to bend in a first bending direction and to cause the second linkage and the second rotation assembly to bend in a second bending direction different from the first bending direction.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numerical terms, such as "first," "second," and "third" may be used to distinguish components to facilitate discussion, and it should be noted that the numerical terms may be used differently or assigned to different elements in the claims. Furthermore, certain numbers (e.g., 90 degrees; 180 degrees) and/or dimensions (e.g., parallel; perpendicular) are used to facilitate discussion and are intended to include variations (e.g., to account for tolerances, such as manufacturing tolerances).

The present disclosure relates generally to a bending system that includes multiple segments that operate to cumulatively provide a bending effect (e.g., a curling effect). For example, the bending system may include the multiple segments that operate to provide the bending effect to a portion of an animated figure (e.g., a finger of a robot; a tail of a dragon) within an attraction of an amusement park. Advantageously, the bending system may include components, as well as an arrangement of the components and/or operational features of the components, that provide sufficient durability for the bending system to repeatedly move between a straight configuration (e.g., uncurled configuration) and a bent configuration (e.g., curled configuration). The bending system may also be compact, which may enable use of the bending system within relatively small structures or within a variety of entertainment elements (e.g., the animated figure, an animated character head, a mechanical structure).

Figure 1:
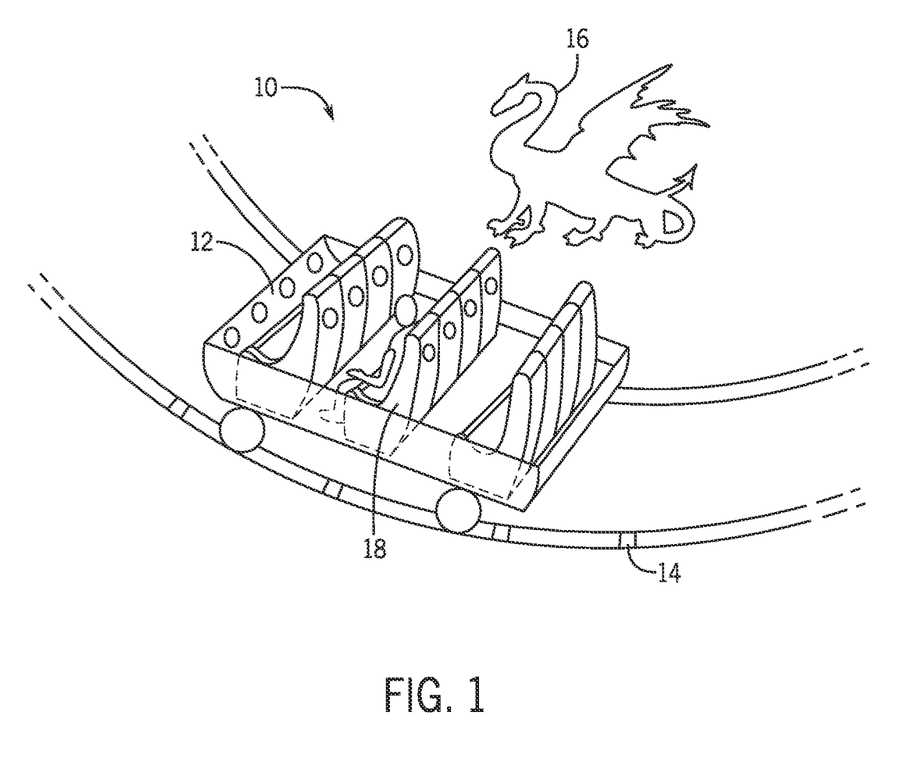
FIG. 1 is a perspective view of an attraction that may be used in an amusement park, in accordance an embodiment of the present disclosure.

With the foregoing in mind, FIG. 1 is a perspective view of an attraction 10 (e.g., a ride attraction) that may be used in an amusement park. The attraction 10 may include a ride vehicle 12, which may travel along a ride path 14 (e.g., track). The ride vehicle 12 may pass one or more entertainment elements 16 as the ride vehicle 12 travels along the ride path 14. The ride vehicle 12 may include one or more seats 18 that are arranged to carry one or more guests on the ride vehicle 12.

It should be appreciated that the ride vehicle 12 may not travel along the ride path 14, but instead, the ride vehicle 12 may be stationary or may move (e.g., tip, spin, raise, lower) without traversing the ride path 14 (e.g., without moving forward or rearward along the ride path 14). It should also be appreciated that the one or more entertainment elements 16 may have any suitable form (e.g., any type of animated figure, animated character head, or mechanical structure) and may be used in other types of attractions (e.g., a haunted house attraction, a character attraction, a musical or theatrical show) in the amusement park or in any of a variety of environments outside of the amusement park.

Figure 2:
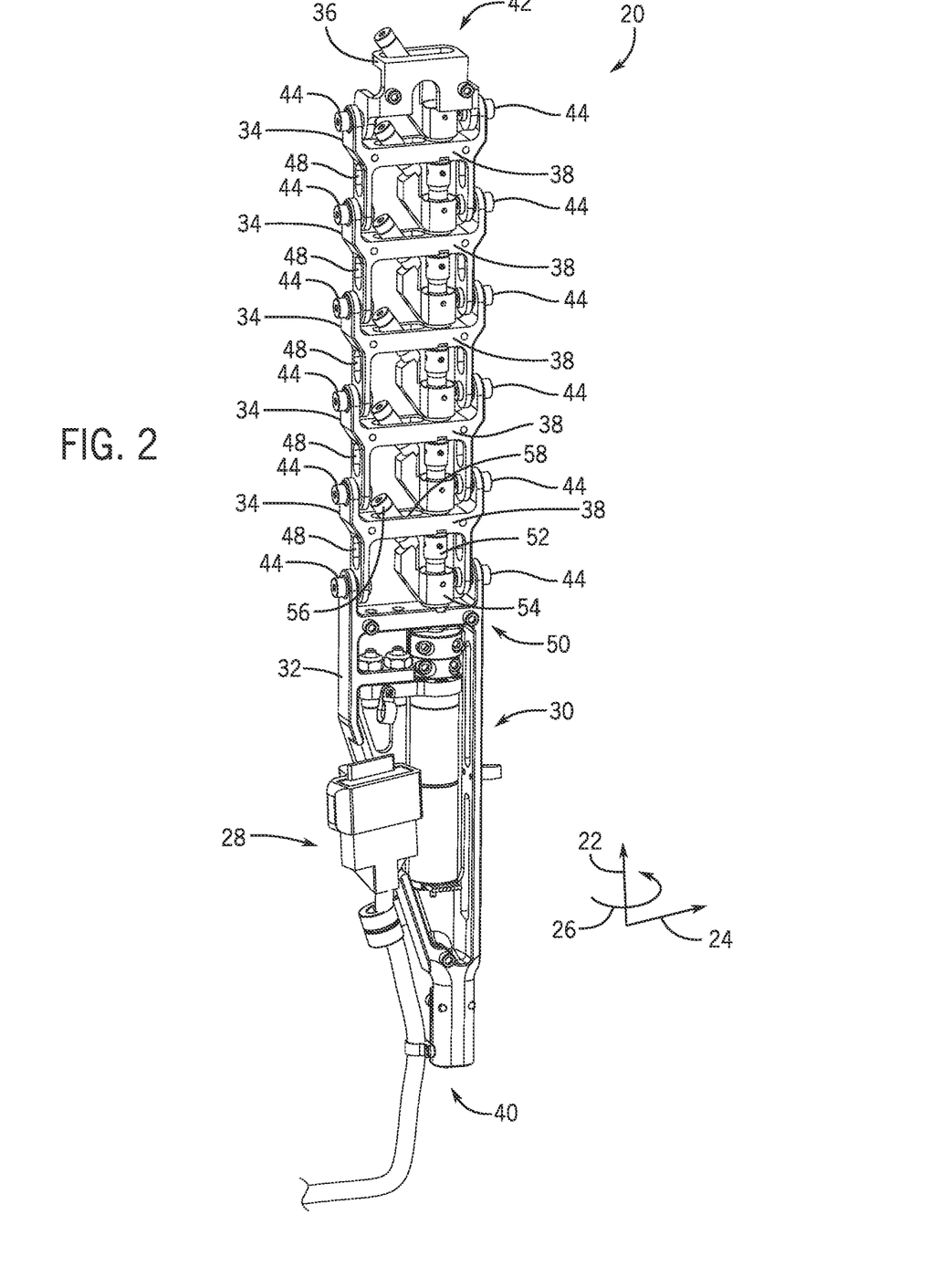
FIG. 2 is a perspective view of a bending system that may be used in the attraction of FIG. 1, in accordance with an embodiment of the present disclosure.

FIG. 2 is a perspective view of an embodiment of a bending system 20 (e.g., segmented bending system). The bending system 20 may be used in the attraction 10 of FIG. 1, such as in the one or more entertainment elements 16 of the attraction 10 of FIG. 1. However, it should be appreciated that the bending system 20 may be used in any type of entertainment element in any type of attraction or environment. In one implementation, the bending system 20 may be used in a body part of an animated figure (e.g., tail of a dragon) so as to bend or to curl the body part of the animated figure. The bending system 20 may be covered by a covering (e.g., cloth, fabric, plastic), which may hide segments of the bending system 20 from view and/or provide a desirable outward appearance (e.g., for the body part of the animated figure).

To facilitate discussion, the bending system 20 may be described with reference to an axial axis or direction 22, a lateral axis or direction 24, and a circumferential axis or direction 26. As shown, the bending system 20 may include a power/control system 28 (e.g., electronic system) that transmits power/control signals to a drive system 30 (e.g., motor). The bending system 20 may also include a base structure 32 (e.g., base linkage), multiple linkages 34, and an end structure 36 (e.g., end linkage) positioned between a first end 40 (e.g., proximal end) and a second end 42 (e.g., distal end). The base structure 32, the multiple linkages 34, and the end structure 36 are coupled in a stacked arrangement at least in part via fasteners 44 (e.g., pins). The fasteners 44 enable relative movement between components, such as relative movement between adjacent linkages 34 (e.g., rotation about the lateral axis 24). Each linkage 34 includes a bar 38 (e.g., laterally-extending bar), as well as brackets 48 on opposite lateral ends of the bar 38. The fasteners 44 couple the brackets 48 of adjacent linkages 34 to one another. It should be appreciated that the base structure 32 and/or the end structure 36 may have a form (e.g., shape) that is the same as or that is different from the multiple linkages 34.

As shown, the base structure 32 may support and/or accommodate the drive system 30. Each of the multiple linkages 34 (including the end structure 36) may be associated with a respective rotation assembly 50, and the rotation assemblies 50 are in a stacked arrangement to extend through the multiple linkages 34. Each linkage 34 (including the end structure 36) and its respective rotation assembly 50 may be considered to form a segment of the bending system 20. Thus, the illustrated bending system 20 includes six segments. However, the bending system may include any number (e.g., 2, 3, 4, 5, 6, 7, 8, or more) of segments.

Each rotation assembly 50 includes a ball joint 52, a cup 54, and a cam member 56 that extends (e.g., radially-outwardly) from the cup 54 and into an opening 58 formed in the bar 38 of the linkage 34. The ball joints 52 and the cups 54 are stacked in an alternating pattern and end-to-end (e.g., along the axial axis 22/coaxial in the straight configuration). Only certain components of the rotation assembly 50 of the linkage 34 that is adjacent to the base structure 32 are numbered in FIG. 2 for image clarity; however, it should be appreciated that each rotation assembly 50 includes the same components. The rotation assemblies 50 are mechanically coupled to one another (e.g., in a stacked arrangement) and rotate together to provide coordinated movement (e.g., bending movement) of the segments of the bending system 20.

Figure 3:
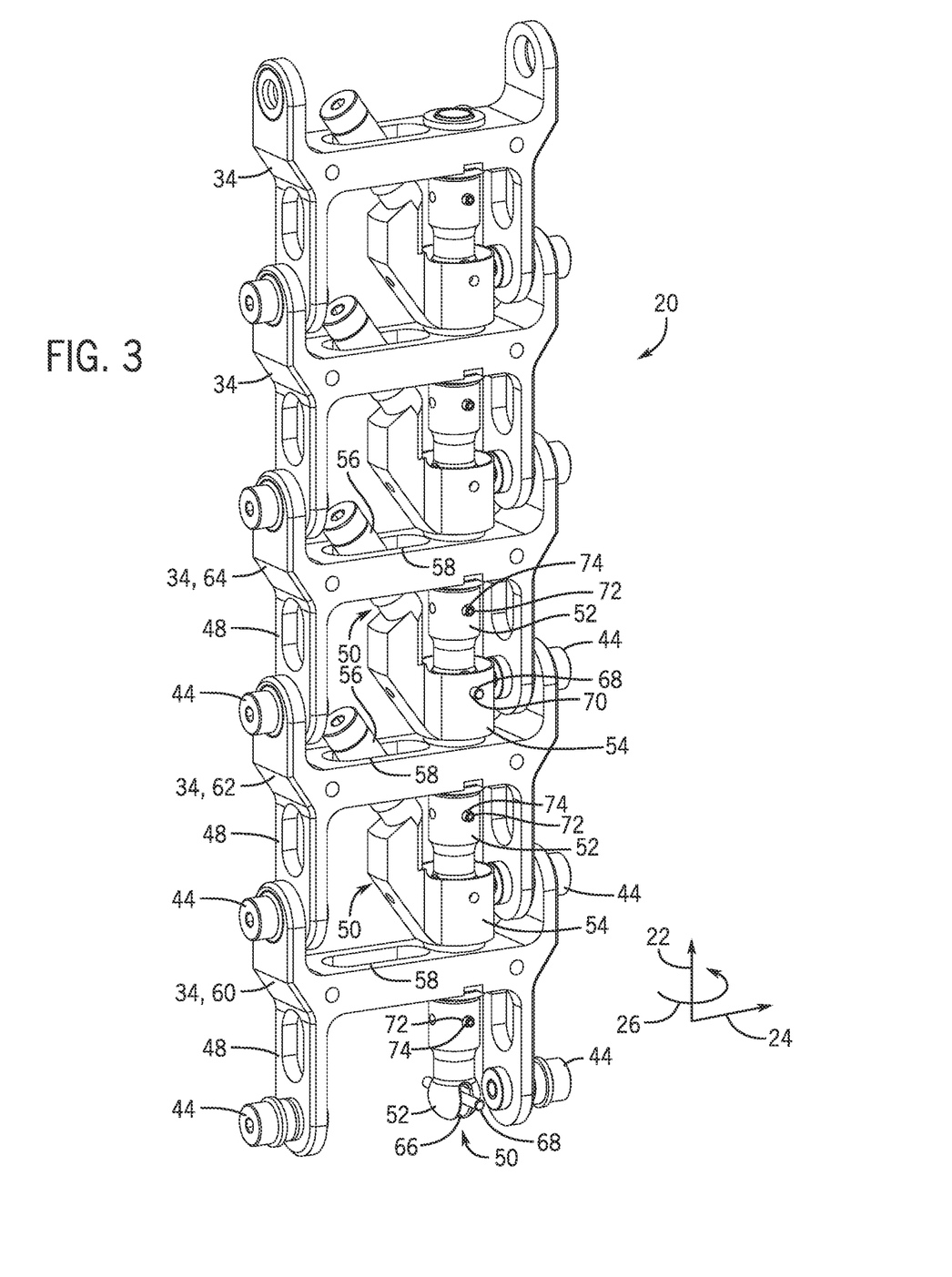
FIG. 3 is a perspective view of a portion of the bending system of FIG. 2, in accordance with an embodiment of the present disclosure.
Figure 4:
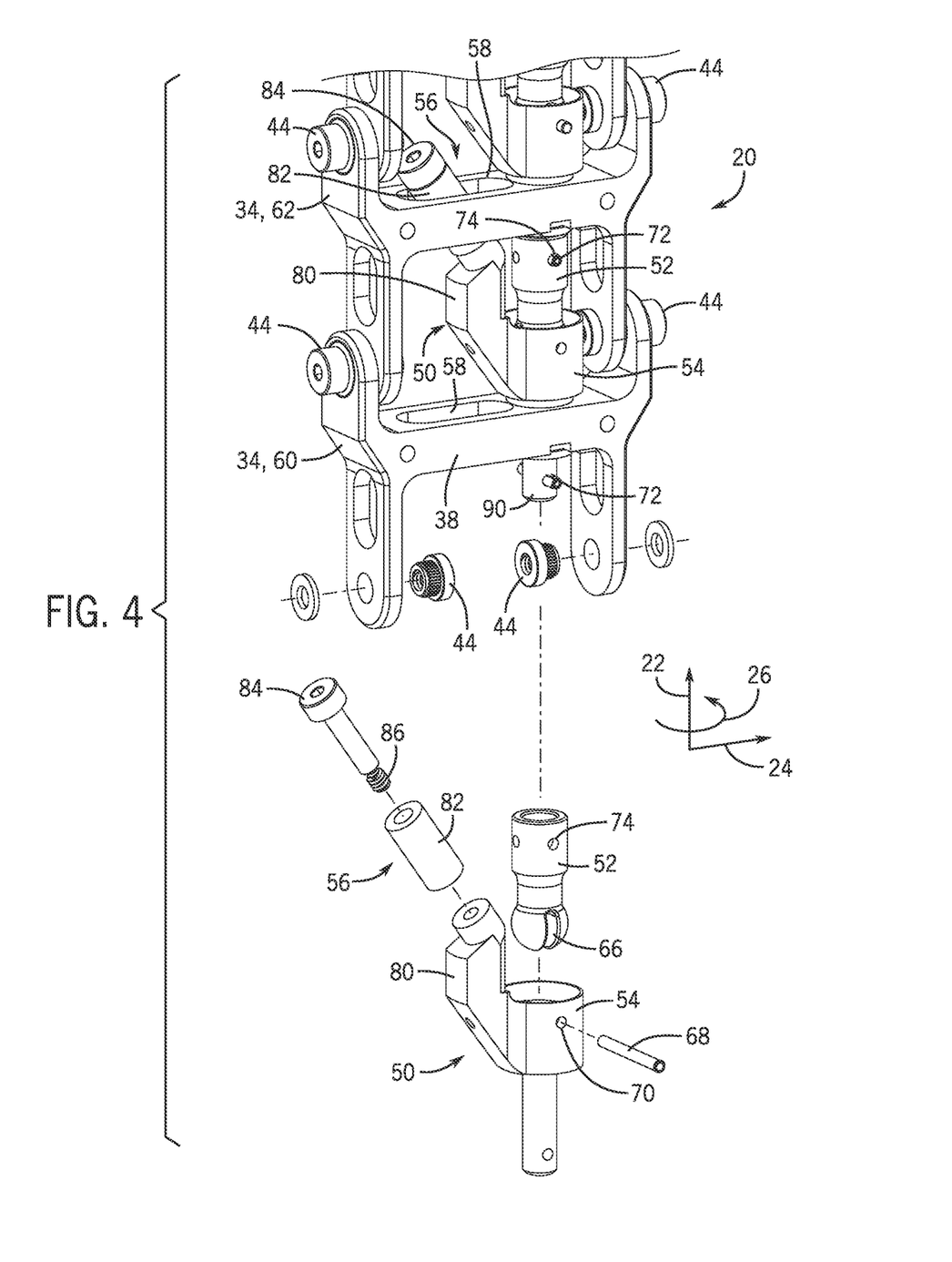
FIG. 4 is an exploded view of a portion of the bending system of FIG. 2, in accordance with an embodiment of the present disclosure.
Figure 5:
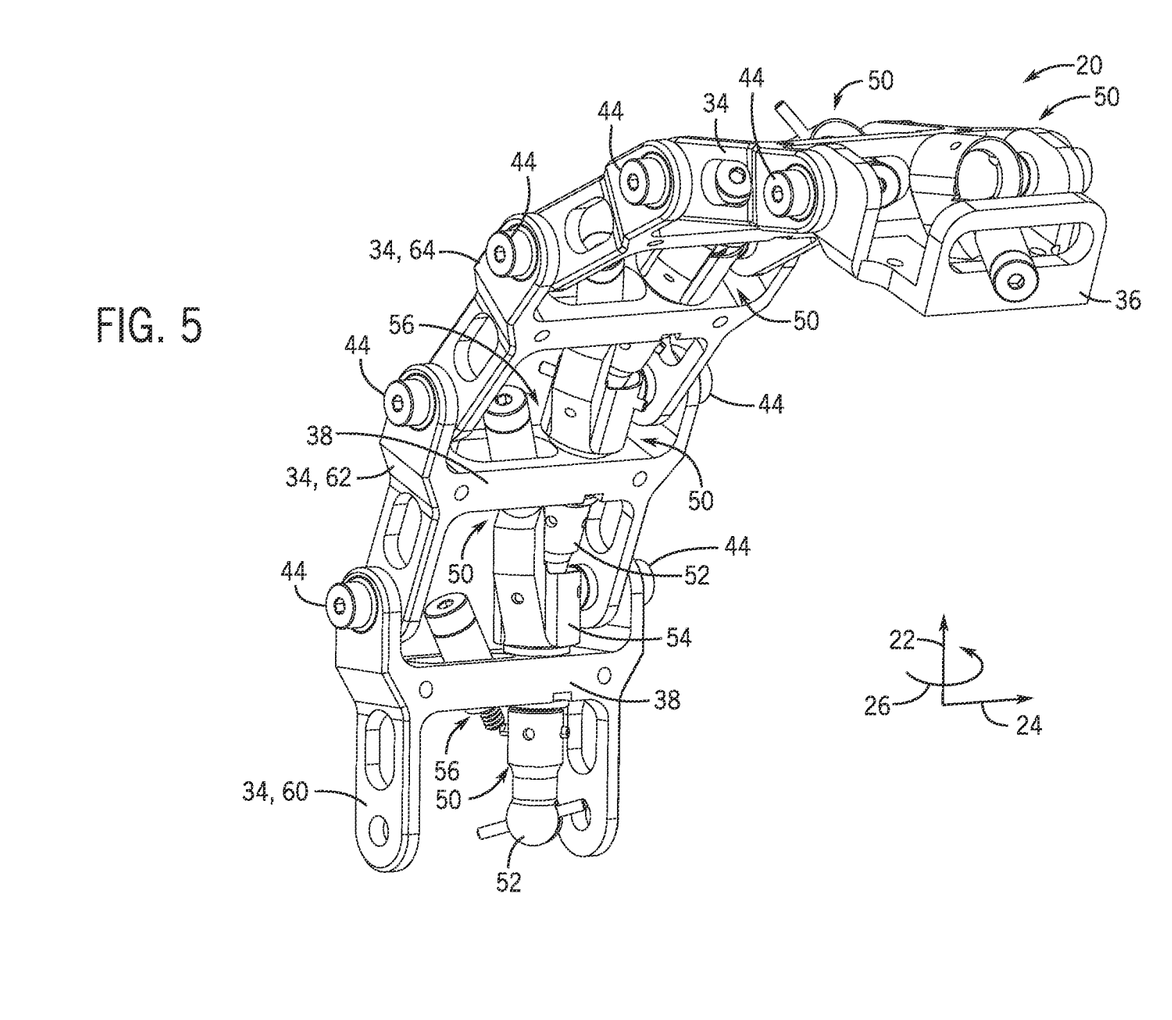
FIG. 5 is a perspective view of a portion of the bending system of FIG. 2, wherein the bending system is in a bent configuration, in accordance with an embodiment of the present disclosure.

Additional features and operational characteristics of the bending system 20 of FIG. 2 may be understood with reference to FIGS. 3-5. In particular, FIG. 3 is a perspective view of a portion of the bending system 20 of FIG. 2, FIG. 4 is an exploded view of a portion of the bending system 20 of FIG. 2, and FIG. 5 is a perspective view of a portion of the bending system 20 of FIG. 2 in a bent configuration (e.g., curled configuration).

As shown in FIG. 3, the portion of the bending system 20 includes the multiple linkages 34 that are joined in the stacked arrangement via the fasteners 44. To facilitate discussion, three linkages 34 are described in detail herein. In particular, a first linkage 34, 60, a second linkage 34, 62, and a third linkage 34, 64 are stacked over one another. The first linkage 34, 60 and the second linkage 34, 62 are coupled via a respective pair of fasteners 44 that extend through openings in the brackets 48. The second linkage 34, 62 and the third linkage 34, 64 are coupled via a respective pair of fasteners 44 that extend through openings in the brackets 48.

Each of the first linkage 34, 60, the second linkage 34, 62, and the third linkage 34, 64 include a respective rotation assembly 50. Each rotation assembly 50 includes the ball joint 52, the cup 54, and the cam member 56. However, the cup 54 and the cam member 56 at the first linkage 34, 60 are omitted in FIG. 3 to better illustrate certain other features, such as a slot 66 that is formed within the ball joint 52 and that is configured to receive a slot pin 68. It should be appreciated that each ball joint 52 of the bending system 20 may include the slot 66 that is configured to receive the slot pin 68. However, in some cases, the slot 66 and the slot pin 68 are oriented in different directions along the stack of the rotation assemblies 54. For example, the slots 66 and the slot pins 68 of the ball joint 52 at the first linkage 34, 60, the think linkage 34, 60, and so on (e.g., every other ball joint 52 at every other linkage 34) are oriented as shown in the exploded view of the rotation assembly 150 at the first linkage 34, 60 in FIG. 3 (e.g., perpendicular to the lateral axis 24 in the straight configuration), while the slots 66 and the slot pins 68 of the ball joint 52 at the second linkage 34, 62, a fourth linkage 34, and so on (e.g., every other ball joint 52 at every other linkage 34) are oriented 90 degrees relative to the slots 66 and the slot pins 68 of the ball joint 52 at the first linkage 34, 60, the think linkage 34, 60, and so on (e.g., aligned with the lateral axis 24 in the straight configuration). This may provide stability as the bending system 20 adjusts between the straight configuration and the bent configuration. Furthermore, the slot pin 68 may engage a slot pin opening 70 formed in the cup 54 (e.g., in a side wall of the cup 54) that supports the ball joint 52 as best shown at the third linkage 34, 64. In addition, a pin 72 extending from the cup 54 at one linkage 34 may engage a pin opening 74 formed in the ball joint 52 (e.g., in a side wall of the ball joint 52) at the adjacent linkage 34. For example, the pin 72 extending from the cup 54 at the third linkage 34, 64 may engage the pin opening 74 formed in the ball joint 52 at the second linkage 34, 62.

For purposes of discussion, FIG. 4 will be described as having the first linkage 34, 60 and the second linkage 34, 62 of FIG. 3. As shown, the rotation assembly 50 of the first linkage 34, 60 includes the ball joint 52, the cup 54, and the cam member 56. The ball joint 52 includes the slot 66 that receives the slot pin 68, and the cup 54 includes the slot pin opening 70 that receives the slot pin 68. Thus, when a ball portion of the ball joint 52 is supported within a recess (e.g., bowl) of the cup 54, and when the slot pin 68 is positioned through the slot 66 and the slot pin opening 70, the slot pin 68 may drive the ball joint 52 to rotate with the cup 54 in the circumferential direction 26. However, the ball joint 52 may also have limited movement relative to the cup 54 (e.g., rotate about an axis perpendicular to a central axis of the slot pin 68) to facilitate bending of the bending system 20.

As shown in FIG. 4, the cam member 56 may include multiple parts, such as an extension 80 (e.g., lateral extension) that extends from the cup 54, a sleeve 82 (e.g., annular sleeve), and a cap 84 that extends through the sleeve 82 to couple to the extension 80 (e.g., via threads 86). This configuration may enable the sleeve 82, which contacts a surface that defines the opening 58, to be formed from a material that is resistant to wear or that has other properties that provide durability to the bending system 20. Additionally or alternatively, the configuration may enable efficient replacement of the sleeve 82 for maintenance operations. However, it should be appreciated that the cam member 56 may have any suitable form that extends from the cup 54 and into the opening 58 (e.g., one-piece construction; integrally formed with the cup 54).

Also, as shown in FIG. 4, the cup 54 at the second linkage 34, 62 includes the pin 72 that engages the pin opening 74 in the ball joint 52 at the first linkage 34, 60. In particular, the cup 54 at the second linkage 34, 62 may include a connector 90 (e.g., axial extension) that extends below (e.g., along the axial axis 22) the second linkage 34, 62 and/or through an opening in the bar 38 of the first linkage 34, 60 after assembly. This position enables the pin 72 that extends from the connector 90 of the cup 54 at the second linkage 34, 62 to engage the pin opening 74 in the ball joint 52 at the first linkage 34, 60. Thus, the slot pins 68 and the pins 72 provide a mechanical link between the adjacent rotation assemblies 50. The mechanical link enables the rotation of one rotation assembly 50 (e.g., in the circumferential direction 26; via the drive system 30 of FIG. 1) to drive the rotation of all of the rotation assemblies 50. It should be appreciated that features of the linkages 34 and the rotation assemblies 50 described with reference to FIGS. 3 and 4 may be included in the other linkages 34 and the other rotation assemblies 50 of the bending system 20.

In operation, the bending system 20 may be configured to adjust from a straight configuration (e.g., uncurled configuration), such as the straight configuration shown in FIGS. 2-4, to a bent configuration, such as the bent configuration shown in FIG. 5. Advantageously, the bending system 20 may adjust from the straight configuration to the bent configuration in response to a control signal that controls the drive system 30 of FIG. 1 to rotate the cup 54 at the linkage 34 that is adjacent to the base structure 32 (e.g., the first linkage 34, 60) in the circumferential direction 26. As a result of the mechanical links between the linkages 34 (including the base structure 32 and the end structure 36) and the mechanical links between the rotation assemblies 50, the rotation of the cup 54 at the linkage 34 that is adjacent to the base structure 32 causes the segments to bend together such that the bending system 20 achieves the bent configuration.

More particularly, upon the rotation of the cup 54 at the linkage 34 that is adjacent to the base structure 32, the cup 54 drives the cam member 56 to rotate in the circumferential direction 26. The cam member 56 is positioned in the opening 58 of bar 38 of the linkage 34, and the cam member 56 slides within the opening 58 and drives the linkage 34 to bend (e.g., via rotation at the fasteners 44). For example, the cam member 56 is repositioned within the opening 58 from a first lateral end portion of the opening 58 that is distally located from the cup 54 (e.g., as shown in FIG. 3) to an intermediate portion of the opening 58 that is closer to the cup 54 (e.g., as shown in FIG. 5). It should be appreciated that the cam member 56 may be repositioned within the opening 58 from the first lateral end portion of the opening 58 to a second lateral end portion of the opening that is proximally located to the cup 54 to provide further bending than is shown in FIG. 5.

The cam member 56 and the opening 58 operate to convert the rotation of the cam member 56 about the circumferential axis 26 into the rotation of the linkage 34 about the lateral axis 24, and each of the linkages 34 is configured to move in this way to enable the bending system 20 to reach the bent configuration. Each ball joint 52 also rotates within the recess of the cup 54 that supports it to enable the bending system 20 to reach the bent configuration. Thus, in the bent configuration, each ball joint 52, the cup 54 above the ball joint 52 (which engages the ball joint 52 via the connector 90 and/or the pin 72 shown in FIG. 4), and the linkage 34 at the ball joint 52 are bent together (e.g., in a plane) relative to the linkage 34 below the ball joint 52. Each ball joint 52, the cup 54 above the ball joint, and the adjacent linkage 34 are bent together at an angle relative to the adjacent linkage 34 below the ball joint 52, and each subsequent or stacked linkage 34 and the components of the rotation assemblies 50 are bent in this way (e.g., the linkage 34 is bent at the angle relative to the adjacent linkage 34) to bend or to curl the bending system 20 along its length.

The bending system 20 may be configured to bend in a first direction (e.g., forward/out of the page; with rotation of the linkages 34 in a first direction about the lateral axis 24) as shown in FIG. 5 when the rotation assemblies 50 rotate in the circumferential direction 26, and the bending system 20 may be configured to bend in a second direction (e.g., backward/into the page; with rotation of the linkages 34 in a second direction about the lateral axis 24) that is opposite the first direction when the rotation assemblies 50 rotate opposite the circumferential direction. Notably, in FIG. 5, only certain components of some of the rotation assemblies 50 are numbered for image clarity. Furthermore, part of the cam member 56 and the cup 54 at the first linkage 34, 60 are omitted for image clarity.

Figure 6:
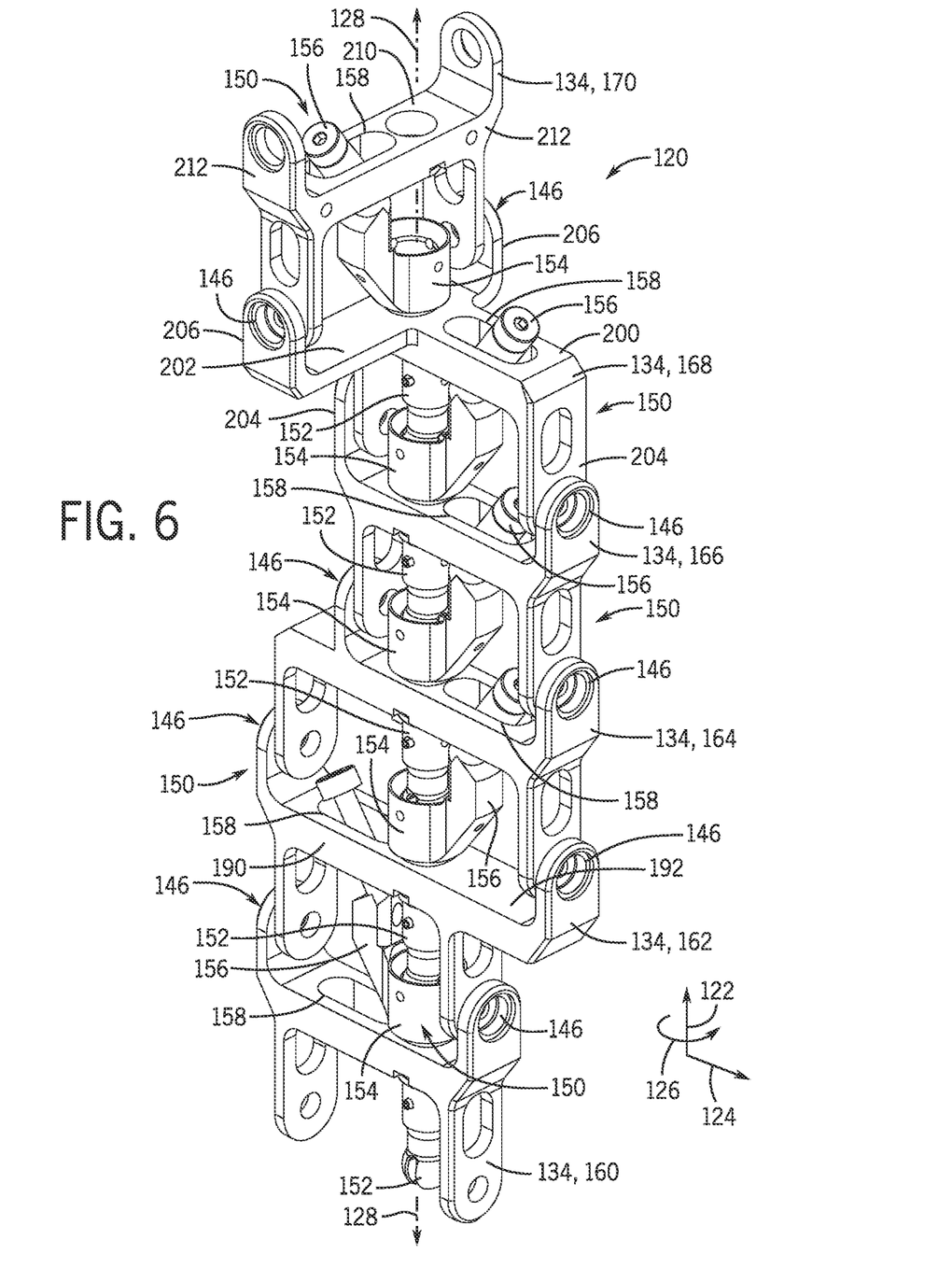
FIG. 6 is a perspective view of a multi-directional bending system that may be used in the attraction of FIG. 1, in accordance with an embodiment of the present disclosure.

FIG. 6 is a perspective view of an embodiment of a multi-directional bending system 120. The bending system 120 may be used in the attraction 10 of FIG. 1, such as in the one or more entertainment elements 16 of the attraction 10 of FIG. 1. However, it should be appreciated that the bending system 120 may be used in any type of entertainment element in any type of attraction or environment. In one implementation, the bending system 120 may be used in a body part of an animated figure (e.g., tail of a dragon) so as to bend or to curl the body part of the animated figure. The bending system 120 may be covered by a covering (e.g., cloth, fabric, plastic), which may hide segments of the bending system 120 from view and/or provide a desirable outward appearance (e.g., for the body part of the animated figure).

To facilitate discussion, the bending system 120 may be described with reference to an axial axis or direction 122, a lateral axis or direction 124, and a circumferential axis or direction 126. The bending system 120 may also be described with respect to a center axis 128 that is parallel to the axial axis 122. It should be appreciated that the bending system 120 may include a power/control system (e.g., electronic control system) that transmits power/control signals to a drive system (e.g., motor), such as the power/control system 28 and the drive system 30 of FIG. 2.

The bending system 120 may also include a base structure and an end structure, such as the base structure 32 and the end structure 36 of FIG. 2. Between the base structure and the end structure, the bending system 120 may include multiple linkages 134 (e.g., brackets). The multiple linkages 134 may be coupled in a stacked arrangement via fasteners (e.g., pins), such as the fasteners 44 of FIG. 2, which may extend through aligned openings 146 in the multiple linkages 134. As shown, each of the multiple linkages 134 may be associated with a respective rotation assembly 150, and the rotation assemblies 150 are in a stacked arrangement to extend through the multiple linkages 134. Each linkage 134 and its respective rotation assembly 150 may be considered to form a segment of the bending system 120. Thus, the illustrated bending system 120 includes six segments. However, the bending system may include any number (e.g., 2, 3, 4, 5, 6, 7, 8, or more) of segments.

Each rotation assembly 150 includes a ball joint 152, a cup 154, and a cam member 156 that extends from the cup 154 and into an opening 158 in of the linkage 134. In a straight configuration, which is shown in FIG. 6, the ball joints 152 and the cups 154 may be centered about and/or be stacked (e.g., in an alternating pattern; end-to-end) along the center axis 128 (e.g., coaxial). However, as shown in FIG. 6, the linkages 134 and the rotation assemblies 150 may be shaped and arranged in any of a variety of manners relative to one another to provide bending in multiple different directions (e.g., different planes; about different axes). To facilitate discussion, the linkages 134 will be referred to as a first linkage 134, 160, a second linkage 134, 162, a third linkage 134, 164, a fourth linkage 134, 166, a fifth linkage 134, 168, and a sixth linkage 134, 170. The first linkage 134, 160 and the rotation assembly 150 at the first linkage 134, 160 may be the same as the first linkage 34, 60 and the rotation assembly 50 at the first linkage 34, 60 of FIGS. 3-5. In FIG. 6, the cup 154 and the cam member 156 of the rotation assembly 150 of the first linkage 134, 160 are omitted for image clarity.

Furthermore, the rotation assembly 150 at the second linkage 134, 162 may be the same as the rotation assembly 50 at the second linkage 34, 62 of FIGS. 3-5, and the cam member 156 of the rotation assembly 150 at the second linkage 134, 162 may be positioned in the opening 158 in the second linkage 134, 162. Additionally, as shown, the opening 158 in the first linkage member 134, 160 and the opening 158 in the second linkage member 134, 160 are aligned within one another (e.g., stacked along the axial axis 122 in the straight configuration; on a first lateral side of the center axis 128). Thus, the first linkage member 134, 160 and the second linkage member 134, 160 may bend as shown in FIG. 5.

However, the second linkage 134, 162 may be different from the second linkage 34, 62 of FIGS. 3-5 in that the second linkage 134, 162 includes a bar 190 (e.g., laterally-extending bar) with the opening 158 on the first lateral side of the center axis 128 and a portion 192 that extends on a second lateral side of the center axis 128. This shape enables the second linkage 134, 162 to couple to (e.g., stack adjacent to) the third linkage 134, 164. In particular, this shape enables the second linkage 134, 162 to accommodate the rotation assembly 150 of the third linkage 134, 164, wherein the rotation assembly 150 of the third linkage 134, 164 includes the cam member 156 on the second lateral side of the center axis 128 (e.g., offset 180 degrees from the cam member 156 of the rotation assembly 150 of the second linkage 134, 162). The cam member 156 of the rotation assembly 150 of the third linkage 134, 164 extends through the opening 158 of the third linkage 134, 164 that is on the second lateral side of the center axis 128 (e.g., offset 180 degrees from the opening 158 of the second linkage 134, 162). Thus, the third linkage 134, 164 may bend in a different direction (e.g., different than the first linkage 134, 160 and the second linkage 134, 162). In particular, while the first linkage 134, 160 and the second linkage 134, 162 bend in a first direction about the lateral axis 124, the third linkage 134, 164 bends in a second direction about the lateral axis 124. It should be appreciated that other variations may be implemented, such as other variations in an angle of the cam 56 relative to the cup 54, to provide different amounts and/or degrees of movement at each linkage 134.

As shown, the fourth linkage 134, 166 and the rotation assembly 150 of the fourth linkage 134, 166 are similar in that the cam member 156 of the rotation assembly 150 of the fourth linkage 134, 166 is on the second lateral side of the center axis 128. The cam member 156 of the rotation assembly 150 of the fourth linkage 134, 166 extends through the opening 158 of the fourth linkage 134, 166 that is on the second lateral side of the center axis 128. Thus, the fourth linkage 134, 166 may bend in the same direction as the third linkage 134, 164 and in a different direction (e.g., different than the first linkage 134, 160 and the second linkage 134, 162).

When these various different segments are stacked and used together in this way (e.g., alternating bending directions), the bending system 120 may bend back and forth along a length of the bending system 120 (e.g., like a sine wave in a side view). While two segments that bend in the first direction and two segments that bend in the second direction are shown, it should be appreciated that any number of linkages 134 may be coupled to one another in any arrangement or pattern to provide a wave configuration. For example, any number of linkages 134 (e.g., 1, 2, 3, 4, 5, 6, or more) may be stacked consecutively to bend in the first direction and any number of linkages 134 (e.g., 1, 2, 3, 4, 5, 6, or more) may be stacked consecutively to bend in the second direction. Furthermore, the linkages 134 may be stacked to provide any number of waves (e.g., alternating peaks and valleys; 2, 3, 4, 5, 6, or more).

With reference to FIG. 6, the fifth linkage 134, 166 may have a cross-type structure. The cross-type structure may be formed by a first bar 200 (e.g., laterally-extending bar) and a second bar 202 (e.g., crossbar) that is transverse (e.g., perpendicular) to the first bar 200. The first bar 200 extends laterally between brackets 204 that extend axially to couple to the fourth linkage 134, 166, and the second bar 202 extends between brackets 206 that couple to the sixth linkage 134, 170. The rotation assembly 150 of the fifth linkage 134, 168 includes the cam member 156 that extends into the opening 158 formed in the first bar 200 of the fifth linkage 134, 168 and that is on the second lateral side of the center axis 128. Thus, the fifth linkage 134, 168 may bend in the same direction as the third linkage 134, 164 and the fourth linkage 134, 166 and in a different direction (e.g., different than the first linkage 134, 160 and the second linkage 134, 162).

The cross-type structure of the fifth linkage 134, 166 enables the fifth linkage 134, 168 to couple to (e.g., stack adjacent to) the sixth linkage 134, 170, which includes a crossbar 210 that is transverse (e.g., perpendicular) to the first bar 200 of the fifth linkage 134, 168. In particular, this shape enables the second bar 202 of the fifth linkage 134, 166 and the crossbar 210 of the sixth linkage 134, 170 to couple to one another (e.g., via respective brackets 206, 212). The cam member 156 of the rotation assembly 150 of the sixth linkage 134, 170 may extend into the opening 158 formed in the crossbar 210 of the sixth linkage 134, 170, which is offset (e.g., between 0 to 360 degrees; between 90 to 180 degrees; approximately 90 to 180 degrees) from the opening 158 formed in the second bar 202 of the fifth linkage 134, 168. The cam member 156 of the rotation assembly 150 of the sixth linkage 134, 170 is offset (e.g., between 0 to 360 degrees; between 90 to 180 degrees; approximately 90 degrees) from the cam member 156 of the rotation assembly 150 of the fifth linkage 134, 168. In operation, the sixth linkage 134, 170 may bend in a different direction (e.g., different plane; different than the other linkages 134 shown in FIG. 6). For example, upon rotation of the rotation assemblies 150 in the circumferential direction 126, the sixth linkage 134, 170 may rotate about an axis transverse to the lateral axis 124, while the other linkages 134 rotate about the lateral axis 124. It should be appreciated that the offset may be any suitable offset (e.g., between 0 to 360 degrees; between 90 to 180 degrees; 90 degrees; 180 degrees) to provide various bends and movement of the linkages 134.

Thus, various visual effects and types of bending (e.g., curling) may be provided with the bending system 120 and/or various combinations of the components disclosed herein. As noted above, the arrangements of the linkages 134 are merely exemplary and other arrangements are envisioned, such as other arrangements to provide different bending directions, wave-like bends, 90 degree turns, and the like. Furthermore, any number of linkages 134 (e.g., 1, 2, 3, 4, 5, 6, or more) may be stacked to bend in one direction, and then any number of linkages 134 (e.g., 1, 2, 3, 4, 5, 6, or more) may be stacked to bend in another direction, and so on. The features described with reference to FIGS. 1-6 may be combined in any suitable manner. For example, the segments in FIG. 6 may have any of the features of the segments of FIGS. 2-5, and vice versa. It should be appreciated that the bending systems 20, 120 may be operated in coordination with the attraction 10 of FIG. 1, such as based on a position of the ride vehicle 12 within the attraction 10 and/or repeatedly (e.g., back and forth between the straight configuration and the bent configuration; periodically; on a timer) during operation of the attraction 10.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A segmented bending system, comprising:
   a plurality of linkages coupled to one another in a stacked arrangement; and
   a plurality of rotation assemblies coupled to one another to extend through the plurality of linkages, wherein the plurality of rotation assemblies comprises a plurality of cam members, each cam member of the plurality of cam members extends into a respective opening formed in a corresponding linkage of the plurality of linkages, and at least one cam member of the plurality of cam members is offset from at least one other cam member of the plurality of cam members in a circumferential direction about a center axis of the plurality of rotation assemblies.

2. The segmented bending system of claim 1, wherein each rotation assembly of the plurality of rotation assemblies comprises a ball joint and a cup that supports the ball joint.

3. The segmented bending system of claim 2, comprising a pin that is configured to engage the ball joint and the cup to block relative movement between the ball joint and the cup in the circumferential direction.

4. The segmented bending system of claim 3, wherein the pin comprises a slot pin that is positioned within a slot of a ball of the ball joint and through a slot pin opening formed in a sidewall of the cup.

5. The segmented bending system of claim 4, wherein the slot is configured to enable the ball joint to rotate relative to the cup about a rotational axis that is perpendicular to a pin center axis of the slot pin.

6. The segmented bending system of claim 1, wherein each linkage of the plurality of linkages comprises a pair of brackets and a laterally-extending bar between the pair of brackets, and the respective opening is formed in the laterally-extending bar.

7. The segmented bending system of claim 1, wherein, in response to rotation of a first rotation assembly of the plurality of rotation assemblies in the circumferential direction about the center axis, the plurality of rotation assemblies and the plurality of linkages bend to form a wave shape along a length of the segmented bending system.

8. The segmented bending system of claim 1, wherein, in response to rotation of a first rotation assembly of the plurality of rotation assemblies in the circumferential direction about the center axis, a first set of linkages of the plurality of linkages is configured to rotate in a first direction about a lateral axis, and a second set of linkages of the plurality of linkages is configured to rotate in a second direction about the lateral axis.

9. The segmented bending system of claim 1, wherein, in response to rotation of a first rotation assembly of the plurality of rotation assemblies in the circumferential direction about the center axis, at least one first linkage of the plurality of linkages is configured to rotate in a first direction about a lateral axis, and at least one second linkage of the plurality of linkages is configured to rotate in a second direction about a rotational axis that is not parallel to the lateral axis.

10. The segmented bending system of claim 1, wherein the at least one cam member of the plurality of cam members is offset by 90 degrees or 180 degrees from at least one other cam member of the plurality of cam members in the circumferential direction about the center axis.

11. A segmented bending system, comprising:
a first segment comprising a first linkage and a first rotation assembly; and
a second segment comprising a second linkage coupled to the first linkage and a second rotation assembly coupled to the first rotation assembly;
wherein the first rotation assembly comprises a first cam member that is configured to engage a first opening in the first linkage to drive the first linkage to bend in a first direction in response to rotation of the first rotation assembly in a circumferential direction, and the second rotation assembly comprises a second cam member that is configured to engage a second opening in the second linkage to drive the second linkage to bend in a second direction in response to rotation of the first rotation assembly in the circumferential direction.

12. The segmented bending system of claim 11, wherein the first rotation assembly comprises a first ball joint and a first cup that supports the first ball joint, and the first cam member extends outwardly from the first cup.

13. The segmented bending system of claim 12, wherein the second rotation assembly comprises a second ball joint and a second cup that supports the second ball joint, the first cam member extends outwardly from the first cup in a first direction, and the second cam member extends outwardly from the second cup in a second direction that is different than the first direction.

14. The segmented bending system of claim 11, wherein the first cam member and the second cam member are offset from one another relative to the circumferential direction.

15. The segmented bending system of claim 14, wherein the first cam member and the second cam member are offset from one another.

16. A segmented bending system, comprising:
a first linkage and a first rotation assembly, wherein the first rotation assembly comprises a first ball joint, a first cup that supports the first ball joint, and a first cam member that extends from the first cup and into a first opening formed in a first bar of the first linkage;
a second linkage and a second rotation assembly, wherein the second rotation assembly comprises a second ball joint, a second cup that supports the second ball joint, and a second cam member that extends from the second cup and into a second opening formed in a second bar of the second linkage, and the second opening is offset from the first opening relative to a circumferential direction about an axis of the segmented bending system; and
a drive system configured to drive rotation of the first rotation assembly in the circumferential direction to cause the first linkage and the first rotation assembly to bend in a first bending direction and to cause the second linkage and the second rotation assembly to bend in a second bending direction different from the first bending direction.

17. The segmented bending system of claim 16, wherein the first rotation assembly and the second rotation assembly are coupled to one another via a pin that blocks relative movement of the first rotation assembly and the second rotation assembly in the circumferential direction.

18. The segmented bending system of claim 17, wherein the first ball joint and the second cup are coupled to one another via the pin.

19. The segmented bending system of claim 16, wherein the first ball joint is configured to rotate within the first cup as the first rotation assembly rotates in the circumferential direction to cause the first linkage and the first rotation assembly to bend in the first bending direction.

20. The segmented bending system of claim 16, wherein the second opening is offset from the first opening by between 90 degrees to 180 degrees relative to the circumferential direction.

* * * * *